United States Patent Office 3,591,389
Patented July 6, 1971

3,591,389
GELLING FISH FOOD COMPOSITION
Earl Schneider, Rego Park, N.Y., assignor to Wardley Products Co., Inc., Long Island City, N.Y.
No Drawing. Filed Sept. 5, 1968, Ser. No. 757,771
Int. Cl. A23k 1/00
U.S. Cl. 99—3                                     6 Claims

ABSTRACT OF THE DISCLOSURE

A gelling fish food composition composed of an edible food substance, a binder, guar gum, and a chelating agent.

SUMMARY OF THE INVENTION

In accordance with this invention, it has been found that when a powdered fish food containing from about 80% to 92% by weight of an edible food substance, from about 0.5% to 5.0% by weight of an organic binder, from about 0.5% to 5.0% by weight of guar gum and from about 0.5% to 5% by weight of a chelating agent is added to water which is at a temperature of from about 120° F. to 212° F. in an amount of from about one part by volume of powder to about 3 to 5 parts by volume of water a firm gel containing the fish food is formed. This gel can be added to the water of a fish tank. The fish food presented in the tank will be maintained in the form of a gel for at least 4 days. In this manner, the food will be presented in a form that is readily available for the fish in the tank to feed upon. Furthermore, the food will be preserved in the gel in a fresh state. The gel maintains the food in a palatable form such that the fish can feed thereon ad libitum without danger of decomposition even after prolonged periods of standing in the tank. Additionally, there is no danger of the fish food swelling and decomposing after long periods of standing in the tank, which swelling and/or decomposition occurs with existing prepared fish foods.

DETAILED DESCRIPTION OF THE INVENTION

This fish food composition of this invention can contain any edible fish food substance in powdered form. Generally, it is preferred to utilize a fish food substance having a high protein content. Among the edible fish food substances that can be utilized in accordance with this invention are included meat meal, shrimp, corn meal, dried flies, clam meal, fish meal, oyster meal, crab meal, wheat germ meal, oatmeal, etc. Generally the edible food substance is present in the composition of this invention in an amount of from about 80 to 92% by weight of the composition. Furthermore, the edible food substance is present in the form of a finely ground powder.

In accordance with this invention, any conventional organic binder can be used in the composition of this invention. Among the conventional binders are the sugars such as corn sugar, fermented corn sugars, gums such as locust bean gum, sodium alginate, ammonium alginate, alginic acid, starches such as corn starch pre-gelatinized wheat starch, carboxymethyl cellulose and agar agar. A preferred binding agent in accordance with this invention is a mixture of fermented corn sugar and locust bean gum. The organic binder or binding agent is usually present in the composition of this invention in the form of a fine powder and in an amount of from about 0.5% to 5% by weight of the composition.

The composition of this invention also contains guar gum in an amount of from about 0.5% to 5% by weight. The guar gum in combination with the organic binder produces a powder composition which will form a firm gel when added to water.

In addition to the edible food substance there is also included in the composition of this invention a chelating agent. Any conventional chelating agent can be utilized in the fish food composition of this invention. Among the conventional chelating agents which can be utilized are included citric acid, borax, gluconic acid, ethylene diamine, tetra-acetic acid, di-ethylene, tri-amine penta-acetic acid, and hydroxy ethyl ethylene di-amine triacetic acid. Among the preferred chelating agents which can be utilized in accordance with this invention is a mixture of borax and citric acid. The chelating agent is present in the composition of this invention in an amount of from about 0.5% to 5% by weight. A desiccant is added to prevent the takeup of moisture from binding the ingredients which otherwise could offset the gelling properties of the composition.

If desired, the composition of this invention can include a preservative. Any conventional preservatives for edible foodstuffs can be utilized, if desired, in the composition of this invention. Among the preferred preservatives are included methyl paraben and sodium proprionate. Generally the preservative is incorporated in the composition of this invention in an amount of from about 1–7% by weight.

Additionally, the composition of this invention can contain a pigment coloring agent. Any conventional pigment coloring agent can be utilized, if desired, in the composition of this invention. Among the conventional pigments which can be utilized in the composition of this invention are included iron oxide, titanium oxides, etc. Furthermore, if desired, an attractant can be added to the composition of this invention. The attractants which are utilized can be any of the conventional attractants for fish generally utilized in conventional fish food compositions. The use of the coloring additive and attractant is conventional in the art and does not form part of the present invention. If desired, special agents such as vitamins, hormones and medications may be added to the gel conveniently and easily and in measured amounts to achieve specific benefit for the fish.

The gelling fish food composition of this invention which is composed of a solid edible food substance, an organic binder, guar gum and a chelating agent is formed by mixing all of the ingredients in their solid form. Any conventional means of mixing can be utilized in preparing the dry fish food composition of this invention. When this dry fish food composition is to be utilized, the fish food is added to water which is at a temperature of from about 120° F. to about 212° F. The fish food composition should be added to water in an amount of about 1 part by volume of powder to about 3–5 parts by volume of water. Upon mixing the 1 part of fish food to 3 to 5 parts of water at about 120° F. to 212° F. the amorphous agglomerate mass is formed. This agglomerate mass is in the form of a firm gel. After the firm gel is formed, the gel is introduced into the fish tank. Thus the edible fish food substance contained therein. In accordance with this invention it has been found that the combination of binder, guar gum, and chelating agent produces a firm gel which is ideally suited for feeding fish in a fish tank.

The invention is further illustrated by the following examples.

EXAMPLE I

A fish food composition was prepared containing the following ingredients.

| Ingredients: | Amount, grams |
|---|---|
| Dried ground shrimp | 62.0 |
| Kelgum [1] | 3.6 |
| Guar gum | 2.7 |
| Citric acid | 0.9 |
| Borax | 0.9 |
| Methyl paraben | 0.7 |
| Sodium propionate | 1.4 |
| Iron oxide | 0.7 |
| Dicalcium phosphate (or any suitable desiccant) | 0.7 |

[1] A mixture containing locust bean gum and microbiologically fermented corn sugar.

Each of the above ingredients was dry weighed and mixed by tumbling. The resulting product was a powdery substance. One teaspoon of this substance was mixed with three teaspoons of water at 145° F. A firm gel resulted. After exposure to air this gel was placed in a beaker of water at room temperature.

EXAMPLE II

A fish food composition was prepared in the same manner as Example I containing the following ingredients.

| Ingredients: | Amount, grams |
|---|---|
| Oyster meal | 50 |
| Kelgum | 3.6 |
| Guar gum | 2.7 |
| Citric acid | 0.9 |
| Borax | 0.9 |
| Methyl paraben | 0.7 |
| Sodium propionate | 1.4 |
| Dicalcium phosphate | 0.6 |

One heaping teaspoon of the above composition was mixed with three teaspoons of water at 140° F. A firm gel resulted.

EXAMPLE III

A fish food composition was prepared in the same manner as Example I utilizing the following ingredients.

| Ingredients: | Amount, grams |
|---|---|
| Clam meal | 50 |
| Kelgum | 3.6 |
| Guar gum | 2.7 |
| Citric acid | 1.0 |
| Borax | 0.9 |
| Methyl paraben | 0.7 |
| Sodium propionate | 1.4 |
| Dicalcium phosphate | 0.6 |

One teaspoon of the powdered product was mixed with three teaspoons of water at 140° F. A firm gel resulted.

What is claimed is:

1. A gelling fish food composition comprising 80% by weight to 92% by weight of an edible food substance having a high protein content, from about 0.5% to 5% by weight of a mixture of locust bean gum and a sugar, from about 0.5% to 5% by weight of guar gum and from about 0.5% to 5% by weight of a mixture of citric acid and borax.

2. The fish food composition of claim 1 wherein said composition contains a preservative.

3. The fish food composition of claim 2 wherein said preservative is a mixture of methyl paraben and sodium propionate.

4. A gelling fish food composition comprising a powder containing from about 80 to 92% by weight of an edible food substance having a high protein content, from about 0.5% to 5% by weight of a mixture of locust bean gum and fermented corn sugar, from about 0.5% to 5% by weight of guar gum, from about 0.5% to 5% by weight of a mixture of citric acid and borax and from 1% by weight to about 7% by weight of a mixture containing methyl paraben and sodium propionate.

5. The fish food composition of claim 4 wherein said edible food substance is dried ground shrimp.

6. A process of preparing a gel fish food composition comprising providing a powdered mixture composed of from about 80% to 90% by weight of an edible food substance having a high protein content, about 0.5% to 5% by weight of a mixture of locust bean gum and a sugar, from about 0.5% to 5% by weight of guar gum and from about 0.5% to 5% by weight of a mixture of citric acid and borax, mixing said powdered mixture in water at a temperature of from about 120° to 212° F. in an amount of from about one part by volume of said powdered mixture to about three to five parts by volume of water so as to form a gel.

References Cited

UNITED STATES PATENTS

| | | | |
|---|---|---|---|
| 2,965,488 | 12/1960 | Belasco | 99—2 |
| 3,116,969 | 1/1964 | Coleman | 99—158 |
| 3,154,423 | 10/1964 | Voegeli et al. | 99—159 |
| 3,352,688 | 11/1967 | Messina | 99—131 |
| 3,361,114 | 1/1968 | Axelrod | 99—3 |
| 3,428,459 | 2/1969 | Hinds | 99—3 |
| 3,476,571 | 11/1969 | Block et al. | 99—130 |

NORMAN YUDKOFF, Primary Examiner

C. P. RIBANDO, Assistant Examiner

U.S. Cl. X.R.

99—2R, 131